(12) United States Patent
Sade et al.

(10) Patent No.: US 10,303,605 B2
(45) Date of Patent: *May 28, 2019

(54) INCREASING INVALID TO MODIFIED PROTOCOL OCCURRENCES IN A COMPUTING SYSTEM

(71) Applicant: INTEL CORPORATION, Santa Clara, CA (US)

(72) Inventors: Raanan Sade, Sarid (IL); Joseph Nuzman, Haifa (IL); Stanislav Shwartsman, Haifa (IL); Igor Yanover, Yokneam Illit (IL); Liron Zur, Haifa (IL)

(73) Assignee: Intel Corporation, Santa Clara, CA (US)

(*) Notice: Subject to any disclaimer, the term of this patent is extended or adjusted under 35 U.S.C. 154(b) by 86 days.

This patent is subject to a terminal disclaimer.

(21) Appl. No.: 15/214,895

(22) Filed: Jul. 20, 2016

(65) Prior Publication Data

US 2018/0024925 A1 Jan. 25, 2018

(51) Int. Cl.
G06F 12/00 (2006.01)
G06F 13/00 (2006.01)
G06F 12/0815 (2016.01)
G06F 12/0893 (2016.01)

(52) U.S. Cl.
CPC ...... G06F 12/0815 (2013.01); G06F 12/0893 (2013.01); *G06F 2212/60* (2013.01); *G06F 2212/62* (2013.01)

(58) Field of Classification Search
CPC ............. G06F 12/0815; G06F 12/0893; G06F 2212/60; G06F 2212/62

USPC ......................................................... 711/119
See application file for complete search history.

(56) References Cited

U.S. PATENT DOCUMENTS

| | | | | |
|---|---|---|---|---|
| 5,555,398 A | * | 9/1996 | Raman ................ | G06F 12/0835 711/143 |
| 5,572,702 A | * | 11/1996 | Sarangdhar ......... | G06F 12/0831 711/146 |
| 5,572,703 A | * | 11/1996 | MacWilliams ..... | G06F 12/0831 711/141 |

(Continued)

FOREIGN PATENT DOCUMENTS

WO 2007/084484 A2 7/2007

OTHER PUBLICATIONS

International Search Report and Written Opinion dated Oct. 17, 2017, on application No. PCT/US2017/041251.

*Primary Examiner* — Sheng Jen Tsai
(74) *Attorney, Agent, or Firm* — Lowenstein Sandler LLP

(57) ABSTRACT

An example system on a chip (SoC) includes a processor, a cache, and a main memory. The SoC can include a first memory to store data in a memory line, wherein the memory line is set to an invalid state. The processor can include a processor coupled to the first memory. The processor can determine that a data size of a first data set received from an application is within a data size range. The processor can determine that an aggregate data size of the first data set and a second data set received from the application is at least a same data size as data size of the memory line. The processor can perform an invalid-to-modify (I2M) operation to change the memory line from the invalid state to a modified state. The processor can write the first data set and the second data set to the memory line.

15 Claims, 10 Drawing Sheets

(56) References Cited

U.S. PATENT DOCUMENTS

| | | | | |
|---|---|---|---|---|
| 5,623,628 A * | 4/1997 | Brayton | G06F 12/0831 | 710/39 |
| 5,797,026 A * | 8/1998 | Rhodehamel | G06F 12/0831 | 711/146 |
| 6,282,615 B1 * | 8/2001 | Arimilli | G06F 12/0804 | 711/122 |
| 6,338,116 B1 * | 1/2002 | Arimilli | G06F 12/0804 | 711/120 |
| 6,615,323 B1 * | 9/2003 | Petersen | G06F 12/0831 | 711/146 |
| 6,678,800 B1 * | 1/2004 | Kurihara | G06F 12/0815 | 711/141 |
| 6,807,590 B1 * | 10/2004 | Carlson | G06F 12/0802 | 710/25 |
| 8,656,106 B2 | 2/2014 | Cox et al. | | |
| 2005/0071573 A1 * | 3/2005 | Dodson | G06F 12/0831 | 711/145 |
| 2006/0080398 A1 * | 4/2006 | Hoover | G06F 12/084 | 709/213 |
| 2008/0320232 A1 * | 12/2008 | Vishin | G06F 12/0806 | 711/143 |
| 2009/0157967 A1 * | 6/2009 | Greiner | G06F 9/30047 | 711/125 |
| 2009/0164735 A1 * | 6/2009 | Nicholas | G06F 12/0811 | 711/141 |
| 2009/0164736 A1 * | 6/2009 | Dorsey | G06F 12/127 | 711/141 |
| 2010/0146217 A1 | 6/2010 | Pape | | |
| 2010/0228922 A1 * | 9/2010 | Limaye | G06F 12/0897 | 711/135 |
| 2010/0269102 A1 * | 10/2010 | Latorre | G06F 9/3842 | 717/130 |
| 2010/0274972 A1 * | 10/2010 | Babayan | G06F 9/3842 | 711/125 |
| 2011/0231593 A1 * | 9/2011 | Yasufuku | G06F 12/1027 | 711/3 |
| 2012/0042133 A1 | 2/2012 | Takeda et al. | | |
| 2013/0282987 A1 | 10/2013 | Koob et al. | | |
| 2014/0040561 A1 * | 2/2014 | Lih | G06F 12/0831 | 711/135 |
| 2014/0297961 A1 * | 10/2014 | Thottethodi | G06F 12/0875 | 711/132 |
| 2015/0178199 A1 * | 6/2015 | Wang | G06F 12/084 | 711/122 |
| 2015/0178206 A1 * | 6/2015 | Chamberlain | G06F 12/0817 | 711/122 |
| 2016/0162406 A1 * | 6/2016 | Latorre | G06F 9/528 | 711/122 |
| 2016/0335177 A1 * | 11/2016 | Huang | G06F 12/0864 | |
| 2017/0109286 A1 * | 4/2017 | Blankenship | G06F 13/4286 | |
| 2018/0137053 A1 * | 5/2018 | Kryukov | G06F 12/0808 | |

* cited by examiner

INCREASING INVALID TO MODIFIED PROTOCOL OCCURRENCES IN A COMPUTING SYSTEM

BACKGROUND

A multi-processor computing system may include multiple computer processors which may work together on a program or operation. Each processor may access the same data or instructions repeatedly. To increase the bandwidth of the multi-processor computing system, each processor may have its own cache which is separate from a shared main memory of the multi-processor computing system. The shared main memory may be slower than the cache, and each processor can store as much information as possible stored in its cache to avoid accessing the shared main memory.

BRIEF DESCRIPTION OF THE DRAWINGS

Various embodiments of the present invention will be understood more fully from the detailed description given below and from the accompanying drawings of various embodiments of the invention.

DESCRIPTION OF EMBODIMENTS

Figure 1:
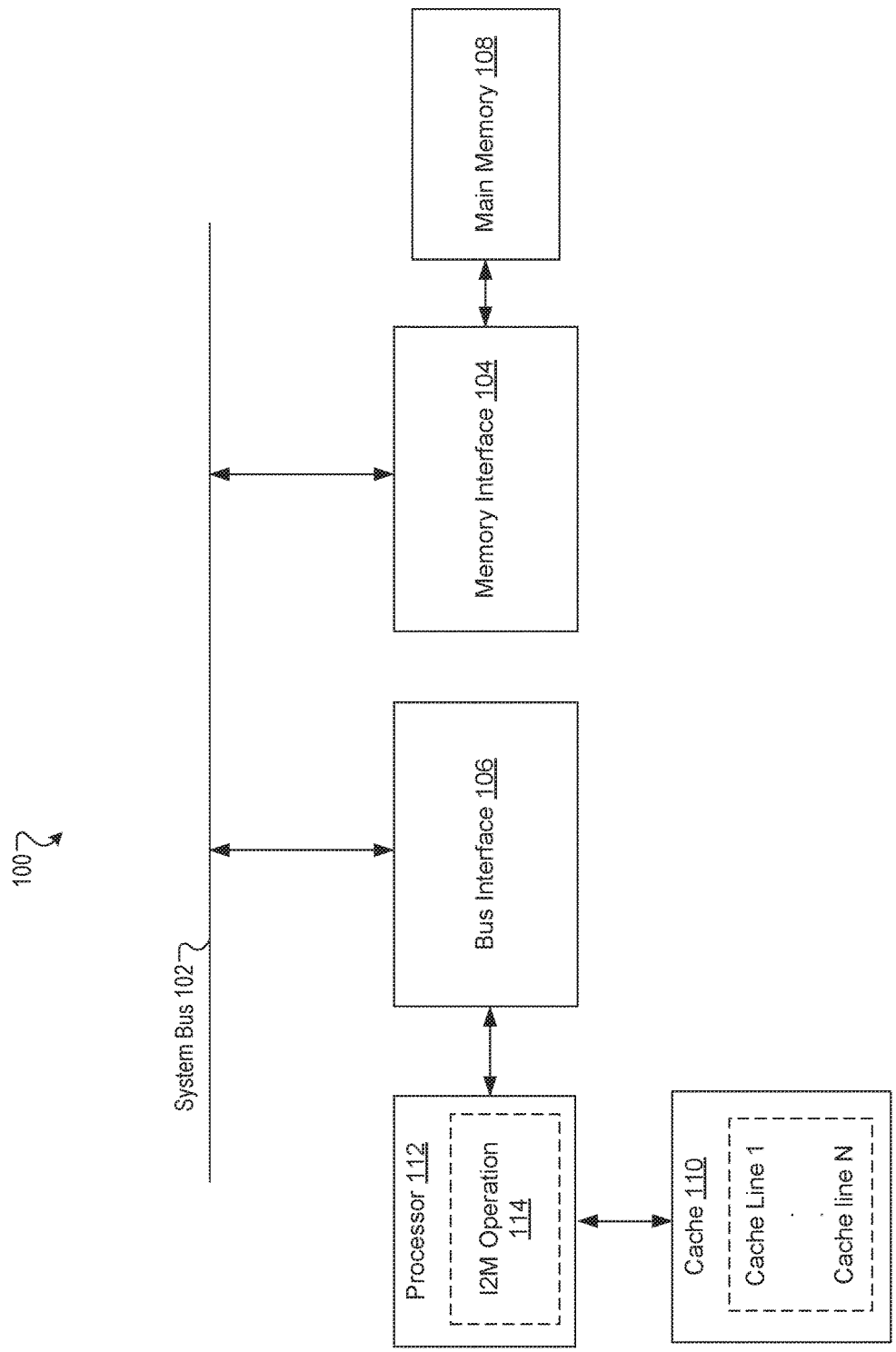
FIG. 1 shows a computing system that includes a main memory and a processor with a cache according to one embodiment.

Most computer systems employ multi-level memory systems. The multi-level memory system can include relatively fast, expensive, limited-capacity caches at the highest level of the memory system and a relatively slower, lower cost, higher capacity main memory at the lowest level of the memory system. Many computer systems employ multiple processors, each of which has one or more caches. The caches can be physically integrated within a processor of a computer system or mounted physically approximate to the processor for increased speed when accessing the cache memory. The processors in the computer system may share the main memory.

A minimum amount of data stored in a cache that can be transferred between the cache and the main memory can be referred to as a memory line, a cache line, a cache block, or a cache page. When the processors share the main memory, a particular memory line may simultaneously exist in the main memory and in one or more of the caches of the multiple processors. In one example, a processor can include one or more processor cores.

To maintain coherency between the caches and the main memory, the memory lines in the caches and the main memory must be identical to each other. For example, a first processor can write data to a first cache. When a second processor reads data from a second cache, the second processor should read the data that was written into the first cache because the data in the first cache line is the current data for that cache line in the memory system. To enable the second processor to access the updated memory line, the data written to the memory line of the first cache is copied to the main memory and the other caches in the memory system.

The computer system can use cache coherency protocols to maintain the coherency between the caches of the multiple processors so that when a memory line is updated in one cache, the change is propagated to the other caches and main memory. For example, when accessing a memory line, the processors are to use the current memory line in the memory system. As a processor modifies a memory line in a cache, the modified memory line becomes the current memory line in the memory system. The cache storing the modified memory line holds the only valid copy of that memory line in the memory system. The memory lines in the other caches and main memory in the memory system must be updated or invalidated to maintain coherency. If a memory line is not updated or invalidated in the other caches and main memory, those memory lines are stale memory lines, e.g., memory lines that are not identical to the updated memory line. A processor using the memory lines that are stale can cause a program or system error.

To maintain coherency, the computing system can implement the cache coherence protocols to set a state of each memory line to an invalid state, a shared state, or a modified state. The invalid state, the shared state, and the modified state indicate different ownership status of a processor for a cache line. When the memory line is in the modified state, the processor can modify the memory line. When the processor modifies the memory line, the data in the memory line of the cache is inconsistent with the data of the memory line in the main memory and the other caches. When a processor changes a cache line to a modified state, the processor must write the memory line to the main memory when the memory line is evicted from the cache.

When a memory line is in a shared state, the memory line is in a read-only state. A processor can evict the memory line that is in the shared state from a cache without writing the data in the memory line to the main memory. When a memory line is in an invalid state, the memory line is empty and the processor fetches the data for the memory line from the main memory or another cache.

Conventionally, a processor may only write data to a memory line in a cache or the main memory when the memory line is in the modified state. For example, a processor may attempt to write data to a memory line and determine that the memory line is in a shared state and cannot be written to, e.g., a miss. When the memory line is in a shared state, all other memory lines stored in the other caches of the memory system must be invalidated first. To invalidate the memory lines in the other caches, a processor can broadcast a request for ownership (RFO) to the other processors in the computer system.

The RFO is an operation in the cache coherency protocols that combines a read operation and an invalidate operation.

For example, the RFO operation is an operation performed by a processor that executes a read operation to read data from a memory address with an intent to write data to the memory address. The processor reads the data to a cache and invalidates all other memory lines in the caches storing this memory line. When the RFO protocol is completed, the processor can add new data to the current data of the memory line when the memory line has sufficient space remaining. In another embodiment, the processor can overwrite the current data in the memory line with new data when there is insufficient room in the memory line for the new data. The sending and receiving of a request and data for the RFO operations can use a significant amount of bandwidth within the memory system. The reduction of bandwidth limits a performance of a central processing unit (CPU) in the computing system.

The embodiments described herein may address the above noted deficiencies by reducing a number of RFO operations and an amount of data transmitted in a memory system. A coherency protocol can reduce a number of RFO operations and an amount of data transmitted in the memory system by converting RFO operations to invalid-to-modified (I2M) requests. Reducing the number of RFO operations in the memory system can increase a performance of the CPU in the computing system. Reducing the number of RFO operations can also decrease a power consumption of the computing system.

FIG. 1 shows a computing system 100 that includes a main memory 108 and a processor 112 with a cache 110 according to one embodiment. In one embodiment, the computing system 100 can be a system on a chip (SoC). In another embodiment, the computing system 100 can be an integrated circuit (IC). The computing system 100 can include a system bus 102 coupled to a memory interface 104 and a bus interface 106. The memory interface 104 is coupled to main memory 108. The bus interface 106 is coupled to the processor 112, and the processor 112 is coupled to the cache 110. When the processor 112 requires data (such as for executing a software program), the processor 112 can check the cache 110.

In one embodiment, when the data is stored in a memory line of the cache 110, the processor can use the data in the memory line. In another embodiment, the memory structure of the cache 110 and the main memory 108 is configured based on a cost-performance balance of accessing the cache 110 and the main memory 108. For example, cache 110 can include static random access memory (SRAM) cells and the main memory 108 can include dynamic random access memory (DRAM) cells. DRAM cells are typically slower and cheaper than SRAM memory cells, resulting in greater latency and reduced system performance whenever information is retrieved from the main memory 108 or stored in the main memory 108. Additionally, because the main memory is accessed via the bus 102, each memory access consumes bandwidth of the computing system 100.

In one embodiment, the storage capacity of the main memory 108 is larger than the storage capacity of the cache 110. Most of the information stored within the computing system 100 can be stored in the main memory 108. Because the cache 110 uses the SRAM cells, the cache 110 is comparatively faster and more expensive than main memory 108. To minimize the cost of computing system 100, the cache 110 can have the lower storage capacity than main memory and to take advantage of the higher speed of the cache 110, the processor can access the cache 110 more frequently than the main memory 108 to retrieve data. The computing system 100 can be designed so that data needed at any instant of time by a processor 112 is more likely to found in the cache 110 rather than the main memory 108.

If the data is not stored in the cache 110, the processor 112 send a request for the data to the memory interface 104 via the system bus 106. The memory interface 104 can retrieve the data from a memory line in the main memory 108. The memory interface 104 can send the data over the system bus 102 to the bus interface 106. The bus interface 106 can forward the data to the processor 112. The processor 112 can use the data for the execution of the software program.

In one embodiment, when a memory line is modified in the cache 110, the memory line may immediately be modified in the main memory 108, i.e., a memory line write through. In another embodiment, the processor 112 may perform an I2M operation 114, as discussed below. For example, when a memory line is modified in the cache 110, the processor 114 may only write the modified memory line to the main memory 108 when the modified memory line in the cache 110 is in a modified state following an I2M request, i.e., a memory line write back. For example, when a memory line in the cache 110 is modified, the processor 114 changes the memory line to a modified state. In one example, the processor 112 may request a change in state to change a memory line in the cache 110. When the processor 112 changes the memory line, other processors and the memory interface 104 can invalidate any shared copies of the memory line.

When the processor 112 labels a memory line read as an RFO, the information read from the memory line read is going to be written over shortly after the read from main memory 108 is performed. By labeling a memory read as an RFO, the processor can notify other processors and elements in the memory system 100 that the present data in main memory 108 at the location where the memory read is going to take place is going to be replaced momentarily. The other processors and elements that have the current information from the memory location can invalidate the copy of the information stored in the corresponding caches, queues, registers, main memory and so forth. In another example, the bus interface 106 typically has logic that detects the RFO notice and broadcasts the RFO notification over the system bus 102 to the other processors and elements in the computing system 100.

Figure 2:
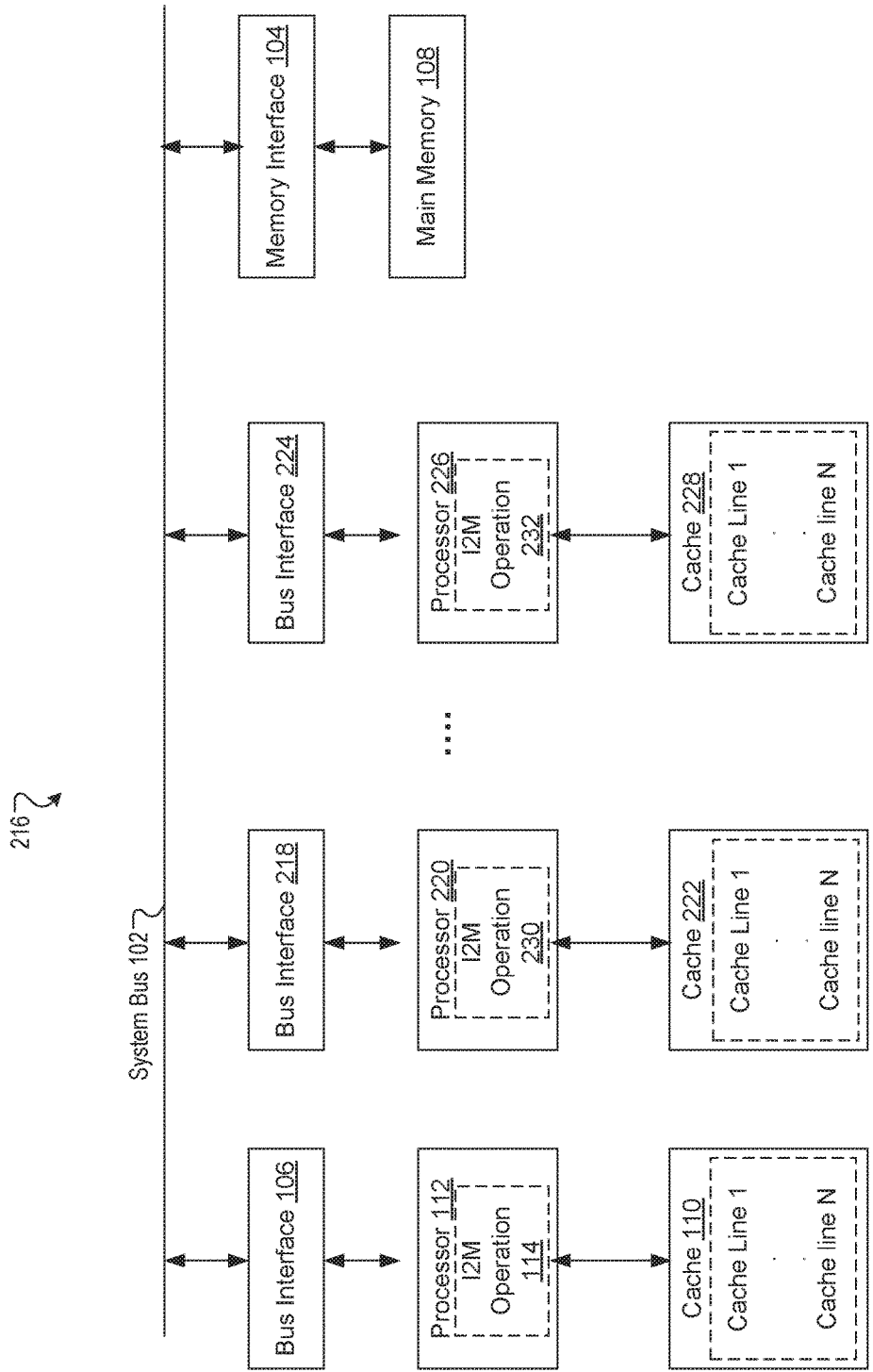
FIG. 2 shows a computing system that includes a main memory and multiple processors with caches according to one embodiment.

FIG. 2 shows a computing system 116 that includes a main memory 108 and processors 112, 220, and 226 with caches 110, 222, and 228, respectively, according to one embodiment. Some of the features in FIG. 1B are the same or similar to the some of the features in FIG. 1A as noted by same reference numbers, unless expressly described otherwise. The computing system 116 can include the system bus 102 coupled to the memory interface 104 and bus interfaces 106, 218, and 224. The memory interface 104 is coupled to the main memory 108. The bus interface 106 is coupled to the processor 112 and the processor 112 is coupled to the cache 110. The bus interface 218 is coupled to the processor 220 and the processor 220 is coupled to the cache 222. The bus interface 224 is coupled to the processor 226 and the processor 226 is coupled to the cache 228.

The memory structure of the caches 110, 222, and 228 and the main memory 108 is configured based on a cost-performance balance of accessing the caches 110, 222, and 228 and the main memory 108. For example, caches 110, 222, and 228 can include the SRAM cells and the main memory 108 can include the DRAM cells.

When one of the processors 112, 220, or 226 requires data (such as for executing a software program), the processor 112, 220, or 226 can check the cache 110, 222, or 228. If the data is not stored in the cache 110, 222, or 228, the processor 112, 220, or 226 send a request for the data to the memory interface 104, via the system bus 102, respectively. The memory interface 104 can retrieve the data from the main memory 108. The memory interface 104 can send the data over the system bus 102 to the bus interface 106, 218, or 224 of the processor. The bus interface 106, 218, or 224 can forward the data to the processor 112, 220, or 226, respectively. The processor 112, 220, or 226 can use the data for the execution of the software program.

To avoid coherency issues, the processor 112, 220, or 226, must first obtain RFO permission from the other processors and the computer system 116 that manages the main memory 108 when the processor 112, 220, or 226 attempts to change data in cache 110, 222, or 228, respectively. For example, the processor 112 can read a first data value from a memory address that the main memory 108 and the processor 220 can also read from. The processor 220 can then receive a request, such as from a software application executed by the processor 220, to change the first data value to a second data value. To avoid the coherency issues, the processor 220 can first obtain an RFO, as discussed above. When the processor 220 has obtained the RFO, the processor can change the first data value to the second data value in the cache 222 as well as the caches 110 and 228 and the main memory 108. In another embodiment, the processors 112, 220, and/or 226 may perform an I2M operation 114, 230, or 232, as discussed below. For example, when the processor 220 receives a request to change the first data value, the processor 220 can use an invalid-to-modified (I2M) request to change the first data value.

Figure 3:
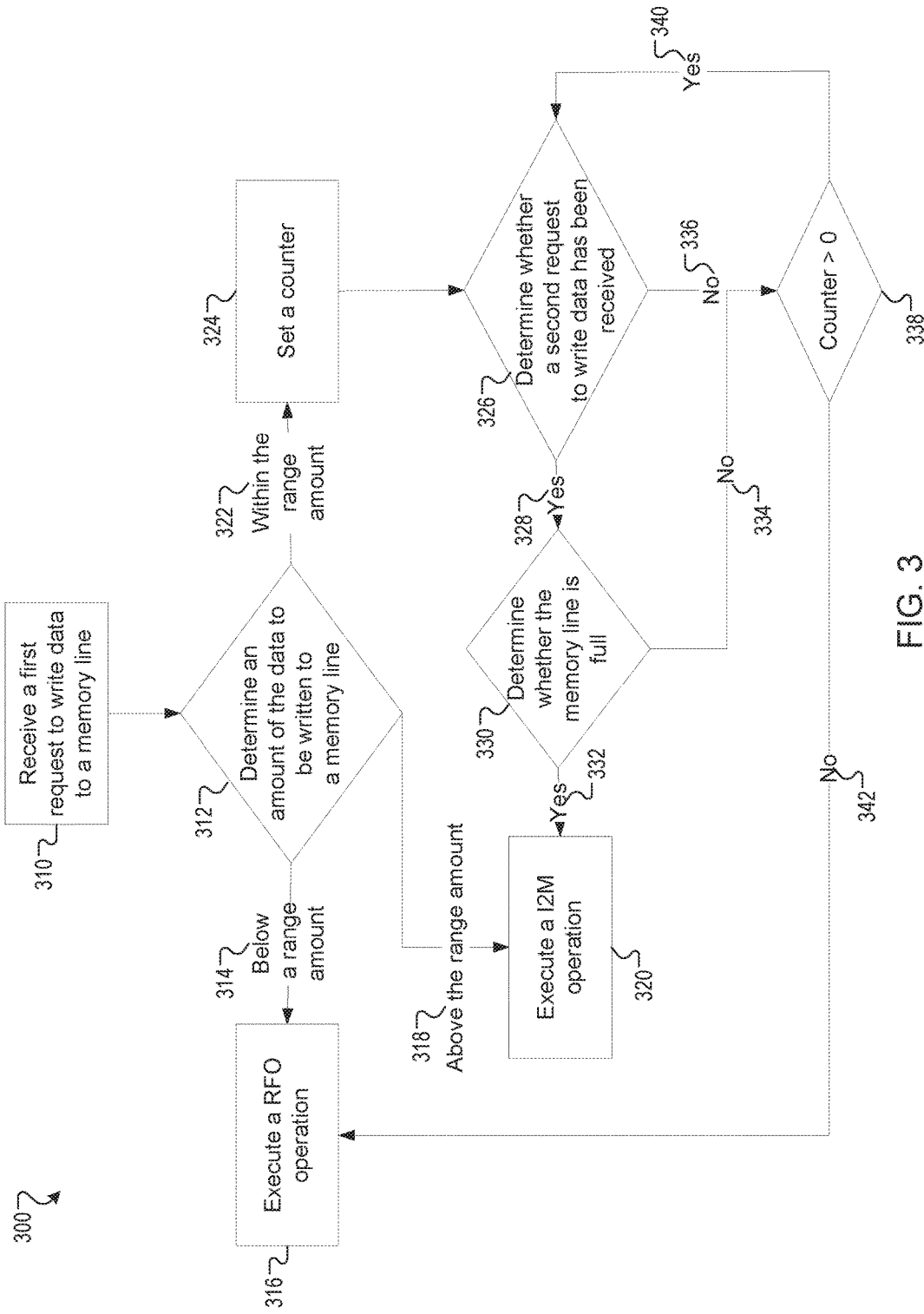
FIG. 3 illustrates a flowchart of a method for determining when to issue an I2M operation according to one embodiment.

FIG. 3 illustrates a flowchart of a method 300 for determining when to issue an I2M operation according to one embodiment. The method 300 may at least partially be performed by processing logic that includes hardware (e.g., circuitry, dedicated logic, programmable logic, microcode, etc.), software (e.g., instructions executed by a processing device), firmware or a combination thereof. In one embodiment, the method 300 may be performed by all or part of the computing system 216 of FIG. 2. For example, the method 300 may be performed by one or more of the processor 112, 220, or 226.

Referring to FIG. 3, the method 300 begins with a processor receiving a first request to write data from a data packet or data set included in the request to a memory line in a cache coupled to the processor (310). In one example, the processor can receive the first request from a software application executed by the processor. In another example, the processor can receive the first request from another device coupled to the processor. The request can include a memory address of a memory line in the cache and data to be written to the memory line.

The method can include the processor determining an amount of data in the data packet that is to be written to the memory line (312). In one embodiment, a predefined data size range can be set for the processors in a computing system. The processor can use the predefined data size range to determine whether to issue an RFO operation or an I2M operation, as discussed in greater detail below. In one example, a memory line can be 64 bytes long and the data size range can be set to range from 16 bytes to 63 bytes. The predefined range can be set to a range that will most likely anticipate that one or more requests to write data to a memory line will fill the size of the memory line within a defined period of time. In this example, when a size of the data to be written to a memory line is below 16 bytes, it is not likely that one or more requests to write data to a memory line will fill the size of the memory line within a given period of time. When a size of the data to be written to a memory line is between 16 bytes and 63 bytes, it is likely that two or more requests to write data to a memory line will fill the size of the memory line within the given period of time. When a size of the data to be written to a memory line is 64 bytes, the data to write to the memory line will fill the size of the memory line within the given period of time.

When the amount of data is below the data size range (314), the processor can issue an RFO operation to write the data to the other caches and the main memory in the computing system (316). The RFO operation can perform the read and invalidate operations to write the data of the memory line to the other caches and main memory, as discussed above When the amount of data exceeds the data size range (318), the processor can execute an I2M operation (320). The I2M operation can convert a state of the memory line from an invalid state (where the processor must fetch the data for the memory line from the main memory or another cache) to a modified state (where the processor can modify the memory line without fetching any data). When the processor has converted the state of the memory line to the modified state, the processor can write the data to the memory line and then send the data in the memory line to other processors coupled to the other caches and the main interface coupled to the main memory. The other processors and memory interfaces can write to the data to the memory addresses in the other caches and main memory that correspond to the memory address of the memory line in the cache.

When the amount of data is within the data size range (322), the processor can set a counter (324). The counter can be set to a predefined amount of time. As discussed above, the predefined amount of time can be a period of time where if the date of the first requests is within or exceeds the data size range, the processor is likely to receive one or more requests that fill the memory line. The predefined amount of time can also be set so that the processor will not be delayed beyond a maximum amount of time and the processor can continue to execute the software program or operation without delays from the memory line data write. In another embodiment, the processor can include a data buffer that stores data from one or more of the requests until the processor determines whether to issue an RFO operation or an I2M operation.

In one example, when the counter has counted down for a defined amount of time, the processor can determine whether the second request to write data from a second data packet or data set to the memory line has been received (326). When the processor has received the second request to write data (328), the processor can determine whether the memory line is full. In one embodiment, the memory line is full when the amount of data from the existing data in the memory line plus the data from the request is the same or greater than the amount of data the memory line can store. In another embodiment, the memory line is full when the amount of data from one or more requests is the same or greater than the amount of data the memory line can store.

When data from the other request is added to the data from the first request, the processor can determine whether the memory line is full (330). For example, the processor can determine that the memory line is full when an aggregate data size of the first data set and the second data set is at least a data size of the memory line.

When the memory line is full (332), the processor can issue an I2M operation (320). In one embodiment, the I2M operation can convert a state of the memory line from an invalid state (where the processor must fetch the data for the memory line from the main memory or another cache) to a modified state (where the processor can modify the memory line without fetching any data). When the processor has converted the state of the memory line to the modified state, the processor can write the data to the memory line and then send the data in the memory line to other processors coupled to the other caches and the main interface coupled to the main memory. The other processors and memory interfaces can write to the data to the memory addresses in the other caches and main memory that correspond to the memory address of the memory line in the cache. In another embodiment, in a multi-processor system, each processor may be responsible for a coherency layer of the DRAM that is connected to it. For example, the processor 220 can issue the I2M request to a coherency agent at the memory interface 104. The coherency agent can send a response to the processor 220 granting the I2M request. When the I2M request is granted, the processor 220 can perform the I2M operation on the cache line.

When the memory line is not full once the processor adds the data from the second request to the memory line (334) or the processor has not received a second request (336), the processor can determine whether the counter is greater than zero (338). When the counter is greater than zero (340), the processor can iteratively determine whether a second request or an additional request has been received and can perform steps 326-340 as discussed above.

When the counter is equal to zero (342), the processor can execute an RFO operation (316). The RFO operation can perform the read and invalidate operations to write the data of the memory line to the other caches and main memory, as discussed above. An advantage of issuing the I2M operation to write data to a memory line when the data will fill the memory line is that the processor will write the data of one or more memory writes to a memory line without having to fetch data from the main memory because of an RFO operation. When the processor does not have to fetch the data from the main memory for the RFO operation, a bandwidth usage will be reduced in the computer system with the processor.

Figure 4:
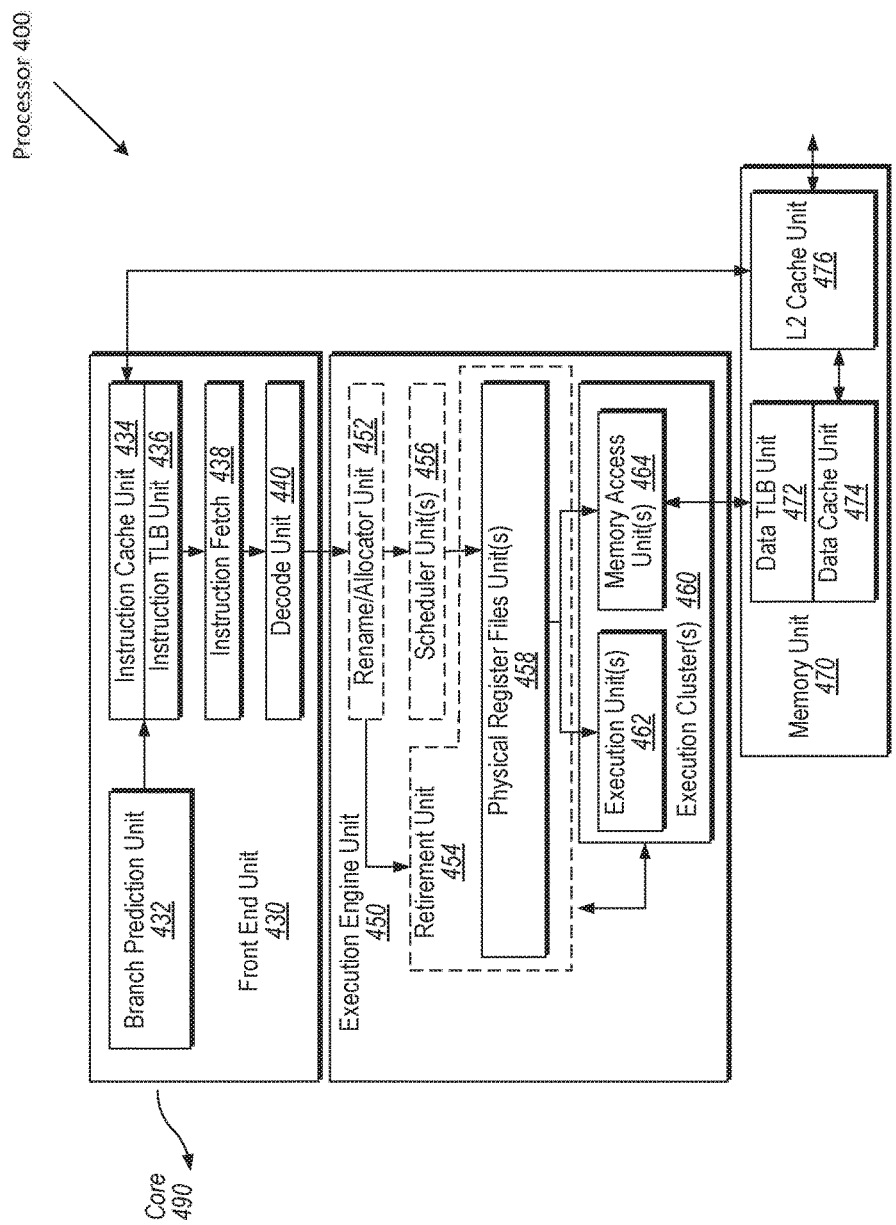
FIG. 4 is a block diagram illustrating a micro-architecture for a processor of FIG. 1, according to one embodiment.

FIG. 4 is a block diagram illustrating a micro-architecture for a processor 400 that implements the system 100 according to one embodiment. Specifically, processor 400 depicts an in-order architecture core and a register renaming logic, out-of-order issue/execution logic to be included in a processor according to at least one embodiment of the disclosure. The embodiments of the system 100 can be implemented in processor 400.

Processor 400 includes a front end unit 430 coupled to an execution engine unit 450, and both are coupled to a memory unit 470. The processor 400 may include a core 490 that is a reduced instruction set computing (RISC) core, a complex instruction set computing (CISC) core, a very long instruction word (VLIW) core, or a hybrid or alternative core type. As yet another option, processor 400 may include a special-purpose core, such as, for example, a network or communication core, compression engine, graphics core, or the like. In another embodiment, the core 490 may have five stages.

The front end unit 430 includes a branch prediction unit 432 coupled to an instruction cache unit 434, which is coupled to an instruction translation lookaside buffer (TLB) unit 436, which is coupled to an instruction fetch unit 438, which is coupled to a decode unit 440. The decode unit 440 (also known as a decoder) may decode instructions, and generate as an output one or more micro-operations, micro-code entry points, microinstructions, other instructions, or other control signals, which are decoded from, or which otherwise reflect, or are derived from, the original instructions. The decode unit 440 may be implemented using various different mechanisms. Examples of suitable mechanisms include, but are not limited to, look-up tables, hardware implementations, programmable logic arrays (PLAs), microcode read only memories (ROMs), etc. The instruction cache unit 434 is further coupled to the memory unit 470. The decode unit 440 is coupled to a rename/allocator unit 452 in the execution engine unit 450.

The execution engine unit 450 includes the rename/allocator unit 452 coupled to a retirement unit 454 and a set of one or more scheduler unit(s) 456. The scheduler unit(s) 456 represents any number of different schedulers, including reservations stations (RS), central instruction window, etc. The scheduler unit(s) 456 is coupled to the physical register file(s) unit(s) 458. Each of the physical register file(s) units 458 represents one or more physical register files, different ones of which store one or more different data types, such as scalar integer, scalar floating point, packed integer, packed floating point, vector integer, vector floating point, etc., status (e.g., an instruction pointer that is the address of the next instruction to be executed), etc. The physical register file(s) unit(s) 458 is overlapped by the retirement unit 454 to illustrate various ways in which register renaming and out-of-order execution may be implemented (e.g., using a reorder buffer(s) and a retirement register file(s), using a future file(s), a history buffer(s), and a retirement register file(s); using a register maps and a pool of registers; etc.).

Generally, the architectural registers are visible from the outside of the processor or from a programmer's perspective. The registers are not limited to any known particular type of circuit. Various different types of registers are suitable as long as they are capable of storing and providing data as described herein. Examples of suitable registers include, but are not limited to, dedicated physical registers, dynamically allocated physical registers using register renaming, combinations of dedicated and dynamically allocated physical registers, etc. The retirement unit 454 and the physical register file(s) unit(s) 458 are coupled to the execution cluster(s) 460. The execution cluster(s) 460 includes a set of one or more execution units 462 and a set of one or more memory access units 464. The execution units 462 may perform various operations (e.g., shifts, addition, subtraction, multiplication) and operate on various types of data (e.g., scalar floating point, packed integer, packed floating point, vector integer, vector floating point).

While some embodiments may include a number of execution units dedicated to specific functions or sets of functions, other embodiments may include only one execution unit or multiple execution units that all perform all functions. The scheduler unit(s) 456, physical register file(s) unit(s) 458, and execution cluster(s) 460 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 464). It should also be understood that where separate pipelines are used, one or more of these pipelines may be out-of-order issue/execution and the rest in-order.

The set of memory access units 464 is coupled to the memory unit 470, which may include a data prefetcher, a data TLB unit 472, a data cache unit (DCU) 474, and a level 2 (L2) cache unit 476, to name a few examples. In some embodiments, DCU 474 is also known as a first level data cache (L1 cache). The DCU 474 may handle multiple outstanding cache misses and continue to service incoming stores and loads. It also supports maintaining cache coherency. The data TLB unit 472 is a cache used to improve virtual address translation speed by mapping virtual and physical address spaces. In one exemplary embodiment, the memory access units 464 may include a load unit, a store address unit, and a store data unit, each of which is coupled to the data TLB unit 472 in the memory unit 470. The L2 cache unit 476 may be coupled to one or more other levels of cache and eventually to the main memory.

In one embodiment, the data prefetcher speculatively loads/prefetches data to the DCU 474 by automatically predicting which data a program is about to consume. Prefetching may refer to transferring data stored in one memory location (e.g., position) of a memory hierarchy (e.g., lower level caches or memory) to a higher-level memory location that is closer (e.g., yields lower access latency) to the processor before the data is actually demanded by the processor. More specifically, prefetching may refer to the early retrieval of data from one of the lower level caches/memory to a data cache and/or prefetch buffer before the processor issues a demand for the specific data being returned.

The processor 400 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.).

It should be understood that the core may not support multithreading (e.g., executing two or more parallel sets of operations or threads, time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology)).

While register renaming is described in the context of out-of-order execution, it should be understood that register renaming may be used in an in-order architecture. While the illustrated embodiment of the processor also includes a separate instruction and data cache units and a shared L2 cache unit, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 5:
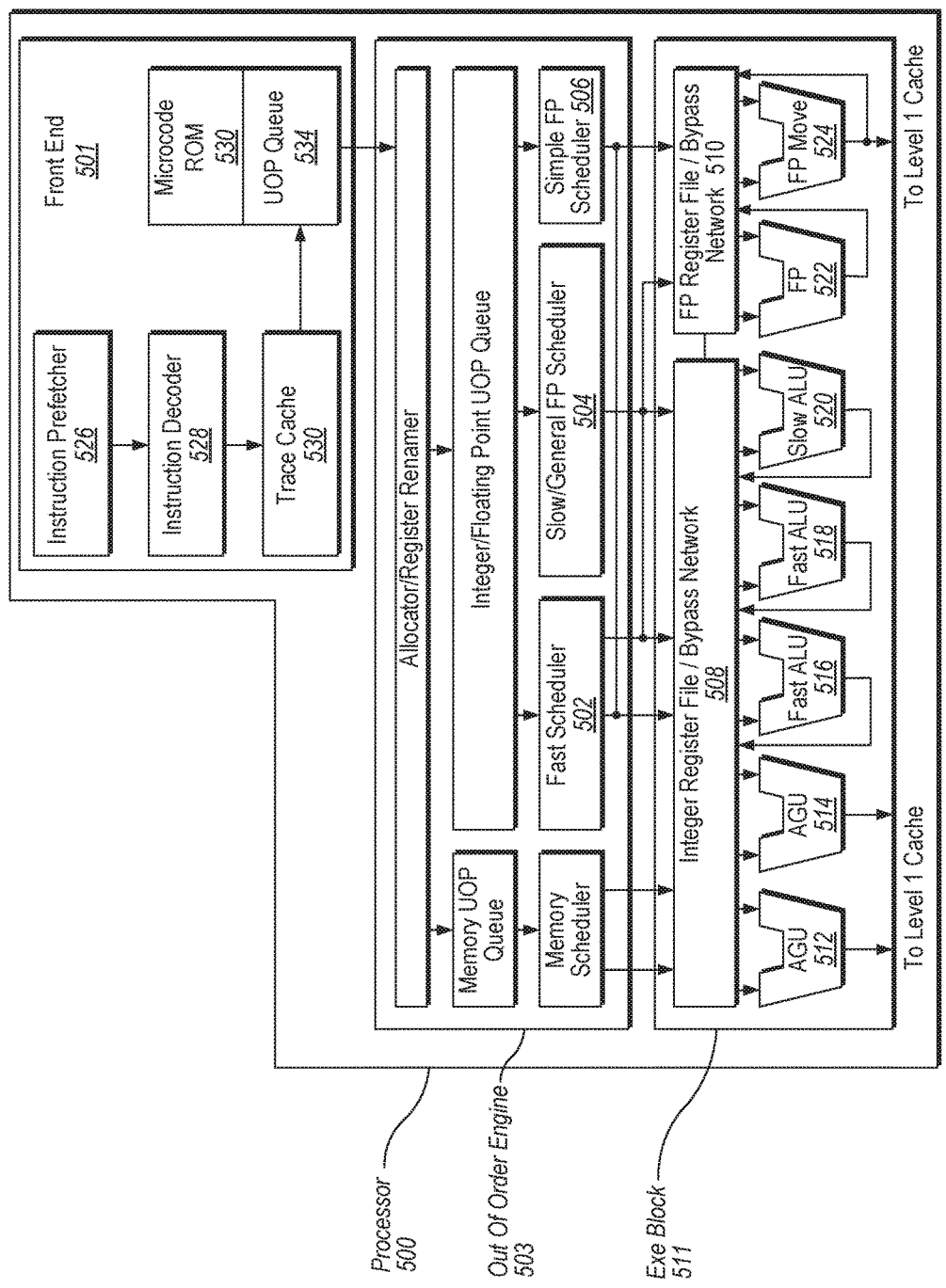
FIG. 5 illustrates a block diagram of the micro-architecture for a processor that includes logic circuits to perform access control, according to one embodiment.

FIG. 5 illustrates a block diagram of the micro-architecture for a processor 500 that includes logic circuits to perform access control according to one embodiment. In one embodiment, processor 500 is the microprocessor 112 or 138 of FIG. 1.

In some embodiments, an instruction in accordance with one embodiment can be implemented to operate on data elements having sizes of byte, word, doubleword, quadword, etc., as well as datatypes, such as single and double precision integer and floating point datatypes. In one embodiment the in-order front end 501 is the part of the processor 500 that fetches instructions to be executed and prepares them to be used later in the processor pipeline. The embodiments of the system 100 can be implemented in processor 500.

The front end 501 may include several units. In one embodiment, the instruction prefetcher 516 fetches instructions from memory and feeds them to an instruction decoder 518 which in turn decodes or interprets them. For example, in one embodiment, the decoder decodes a received instruction into one or more operations called "micro-instructions" or "micro-operations" (also called micro-op or uops) that the machine can execute. In other embodiments, the decoder parses the instruction into an opcode and corresponding data and control fields that are used by the micro-architecture to perform operations in accordance with one embodiment. In one embodiment, the trace cache 530 takes decoded uops and assembles them into program ordered sequences or traces in the uop queue 534 for execution. When the trace cache 530 encounters a complex instruction, the microcode ROM 532 provides the uops needed to complete the operation.

Some instructions are converted into a single micro-op, whereas others need several micro-ops to complete the full operation. In one embodiment, if more than four micro-ops are needed to complete an instruction, the decoder 518 accesses the microcode ROM 532 to do the instruction. For one embodiment, an instruction can be decoded into a small number of micro-ops for processing at the instruction decoder 518. In another embodiment, an instruction can be stored within the microcode ROM 532 should a number of micro-ops be needed to accomplish the operation. The trace cache 530 refers to an entry point programmable logic array (PLA) to determine a correct micro-instruction pointer for reading the micro-code sequences to complete one or more instructions in accordance with one embodiment from the micro-code ROM 532. After the micro-code, ROM 532 finishes sequencing micro-ops for an instruction, the front end 501 of the machine resumes fetching micro-ops from the trace cache 530.

The out-of-order execution engine 503 is where the instructions are prepared for execution. The out-of-order execution logic has a number of buffers to smooth out and re-order the flow of instructions to optimize performance as they go down the pipeline and get scheduled for execution. The allocator logic allocates the machine buffers and resources that each uop needs in order to execute. The register renaming logic renames logic registers onto entries in a register file. The allocator also allocates an entry for each uop in one of the two uop queues, one for memory operations and one for non-memory operations, in front of the instruction schedulers: memory scheduler, fast scheduler 502, slow/general floating point scheduler 504, and simple floating point scheduler 506. The uop schedulers 502, 504, 506, determine when a uop is ready to execute based on the readiness of their dependent input register operand sources and the availability of the execution resources the uops need to complete their operation. The fast scheduler 502 of one embodiment can schedule on each half of the main clock cycle while the other schedulers can only schedule once per main processor clock cycle. The schedulers arbitrate for the dispatch ports to schedule uops for execution.

Register files 508, 510, sit between the schedulers 502, 504, 506, and the execution units 512, 514, 516, 518, 520, 522, 524 in the execution block 511. There is a separate register file 508, 510, for integer and floating point operations, respectively. Each register file 508, 510, of one embodiment also includes a bypass network that can bypass or forward just completed results that have not yet been written into the register file to new dependent uops. The integer register file 508 and the floating point register file 510 are also capable of communicating data with the other. For one embodiment, the integer register file 508 is split into two separate register files, one register file for the low order 32 bits of data and a second register file for the high order 32 bits of data. The floating point register file 510 of one embodiment has 128 bit wide entries because floating point instructions typically have operands from 64 to 128 bits in width.

The execution block 511 contains the execution units 512, 514, 516, 518, 520, 522, 524, where the instructions are actually executed. This section includes the register files 508, 510, that store the integer and floating point data operand values that the micro-instructions need to execute. The processor 500 of one embodiment is comprised of a number of execution units: address generation unit (AGU) 512, AGU 514, fast ALU 516, fast ALU 518, slow ALU 520, floating point ALU 522, floating point move unit 524. For one embodiment, the floating point execution blocks 522, 524, execute floating point, MMX, SIMD, and SSE, or other operations. The floating point ALU 522 of one embodiment includes a 64-bit by 64-bit floating point divider to execute divide, square root, and remainder micro-ops. For embodiments of the present disclosure, instructions involving a floating point value may be handled with the floating point hardware.

In one embodiment, the ALU operations go to the high-speed ALU execution units 516, 518. The fast ALUs 516, 518, of one embodiment can execute fast operations with an effective latency of half a clock cycle. For one embodiment, most complex integer operations go to the slow ALU 520 as the slow ALU 520 includes integer execution hardware for long latency type of operations, such as a multiplier, shifts, flag logic, and branch processing. Memory load/store operations are executed by the AGUs 512, 514. For one embodiment, the integer ALUs 516, 518, 520, are described in the context of performing integer operations on 64-bit data operands. In alternative embodiments, the ALUs 516, 518, 520, can be implemented to support a variety of data bits including 16, 32, 128, 256, etc. Similarly, the floating point units 522, 524, can be implemented to support a range of operands having bits of various widths. For one embodiment, the floating point units 522, 524, can operate on 128 bits wide packed data operands in conjunction with SIMD and multimedia instructions.

In one embodiment, the uops schedulers 502, 504, 506, dispatch dependent operations before the parent load has finished executing. As uops are speculatively scheduled and executed in processor 500, the processor 500 also includes logic to handle memory misses. If a data load misses in the data cache, there can be dependent operations in flight in the pipeline that have left the scheduler with temporarily incorrect data. A replay mechanism tracks and re-executes instructions that use incorrect data. Only the dependent operations need to be replayed and the independent ones are allowed to complete. The schedulers and replay mechanism of one embodiment of a processor are also designed to catch instruction sequences for text string comparison operations.

The processor 500 also includes logic to implement access control according to one embodiment. In one embodiment, the execution block 511 of processor 500 may include PEL, to perform access control according to the description herein.

The term "registers" may refer to the on-board processor storage locations that are used as part of instructions to identify operands. In other words, registers may be those that are usable from the outside of the processor (from a programmer's perspective). However, the registers of an embodiment should not be limited in meaning to a particular type of circuit. Rather, a register of an embodiment is capable of storing and providing data, and performing the functions described herein. The registers described herein can be implemented by circuitry within a processor using any number of different techniques, such as dedicated physical registers, dynamically allocated physical registers using register renaming, combinations of dedicated and dynamically allocated physical registers, etc. In one embodiment, integer registers store thirty-two bit integer data. A register file of one embodiment also contains eight multimedia SIMD registers for packed data.

For the discussions herein, the registers are understood to be data registers designed to hold packed data, such as 64 bits wide MMX™ registers (also referred to as 'mm' registers in some instances) in microprocessors enabled with MMX technology from Intel Corporation of Santa Clara, Calif. These MMX registers, available in both integer and floating point forms, can operate with packed data elements that accompany SIMD and SSE instructions. Similarly, 128 bits wide XMM registers relating to SSE2, SSE3, SSE4, or beyond (referred to generically as "SSEx") technology can also be used to hold such packed data operands. In one embodiment, in storing packed data and integer data, the registers do not need to differentiate between the two data types. In one embodiment, integer and floating point are either contained in the same register file or different register files. Furthermore, in one embodiment, floating point and integer data may be stored in different registers or the same registers.

Figure 6:
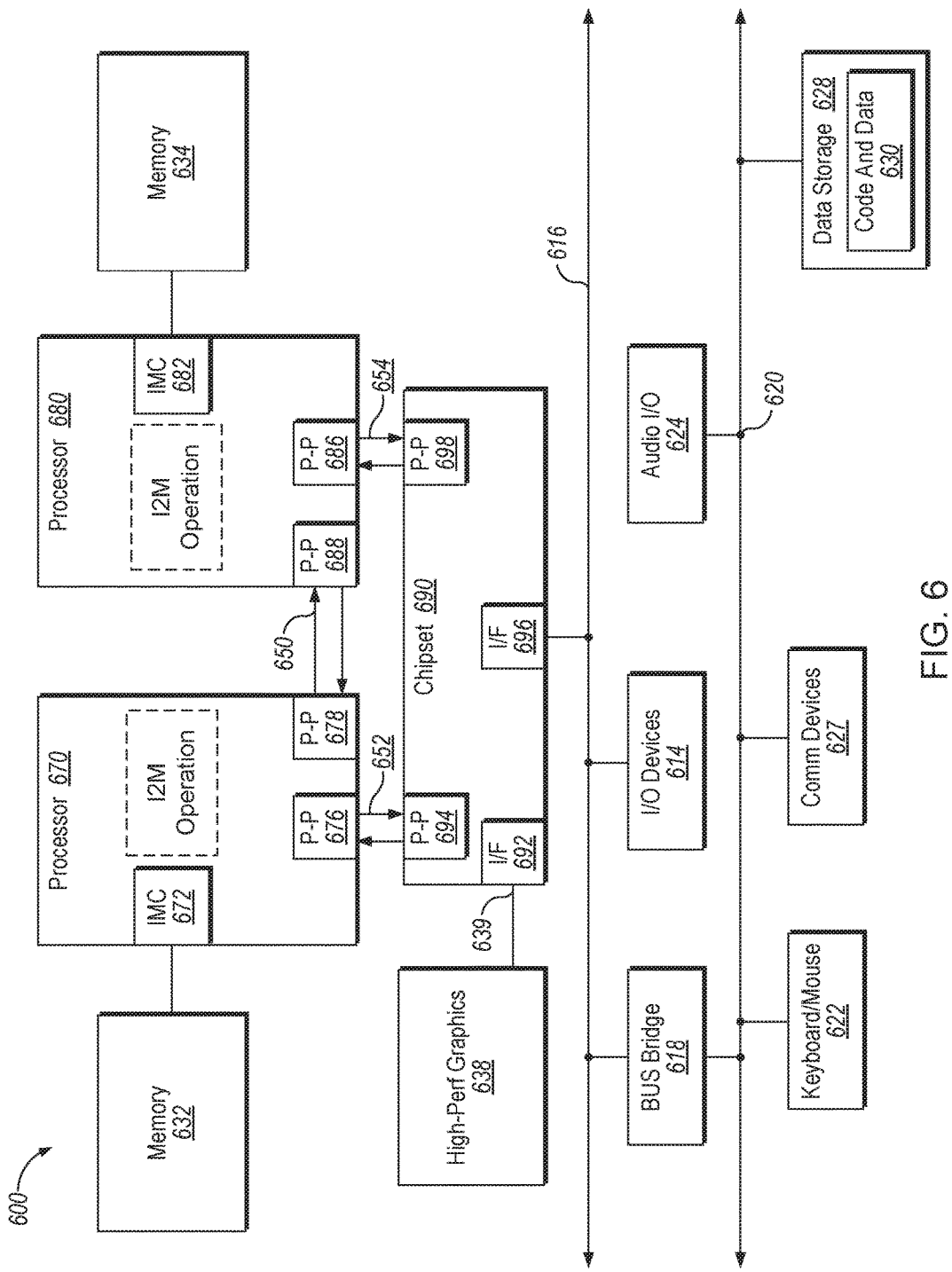
FIG. 6 is a block diagram of a computer system according to one implementation.

Embodiments may be implemented in many different system types. Referring now to FIG. 6, shown is a block diagram of a multiprocessor system 600 in accordance with an implementation. As shown in FIG. 6, multiprocessor system 600 is a point-to-point interconnect system, and includes a first processor 670 and a second processor 680 coupled via a point-to-point interconnect 650. As shown in FIG. 6, each of processors 670 and 680 may be multicore processors, including first and second processor cores (i.e., processor cores 674a and 674b and processor cores 684a and 684b), although potentially many more cores may be present in the processors. The processors each may include hybrid write mode logics in accordance with an embodiment of the present. The embodiments of the system 100 can be implemented in the processor 670, processor 680, or both.

While shown with two processors 670, 680, it is to be understood that the scope of the present disclosure is not so limited. In other implementations, one or more additional processors may be present in a given processor.

Processors 670 and 680 are shown including integrated memory controller units 682 and 682, respectively. Processor 670 also includes as part of its bus controller units point-to-point (P-P) interfaces 676 and 688; similarly, second processor 680 includes P-P interfaces 686 and 688. Processors 670, 680 may exchange information via a point-to-point (P-P) interface 650 using P-P interface circuits 688, 688. As shown in FIG. 6, IMCs 682 and 682 couple the processors to respective memories, namely a memory 632 and a memory 634, which may be portions of main memory locally attached to the respective processors.

Processors 670, 680 may each exchange information with a chipset 690 via individual P-P interfaces 652, 654 using point to point interface circuits 676, 694, 686, 698. Chipset 690 may also exchange information with a high-performance graphics circuit 638 via a high-performance graphics interface 639.

A shared cache (not shown) may be included in either processor or outside of both processors, yet connected with the processors via P-P interconnect, such that either or both processors' local cache information may be stored in the shared cache if a processor is placed into a low power mode.

Chipset 690 may be coupled to a first bus 616 via an interface 696. In one embodiment, first bus 616 may be a Peripheral Component Interconnect (PCI) bus, or a bus such as a PCI Express bus or another third generation I/O interconnect bus, although the scope of the present disclosure is not so limited.

As shown in FIG. 6, various I/O devices 614 may be coupled to first bus 616, along with a bus bridge 618 which couples first bus 616 to a second bus 620. In one embodiment, second bus 620 may be a low pin count (LPC) bus. Various devices may be coupled to second bus 620 including, for example, a keyboard and/or mouse 622, communication devices 627 and a storage unit 628 such as a disk drive or other mass storage device which may include instructions/code and data 630, in one embodiment. Further, an audio I/O 624 may be coupled to second bus 620. Note that other architectures are possible. For example, instead of the point-to-point architecture of FIG. 6, a system may implement a multi-drop bus or other such architecture.

Figure 7:
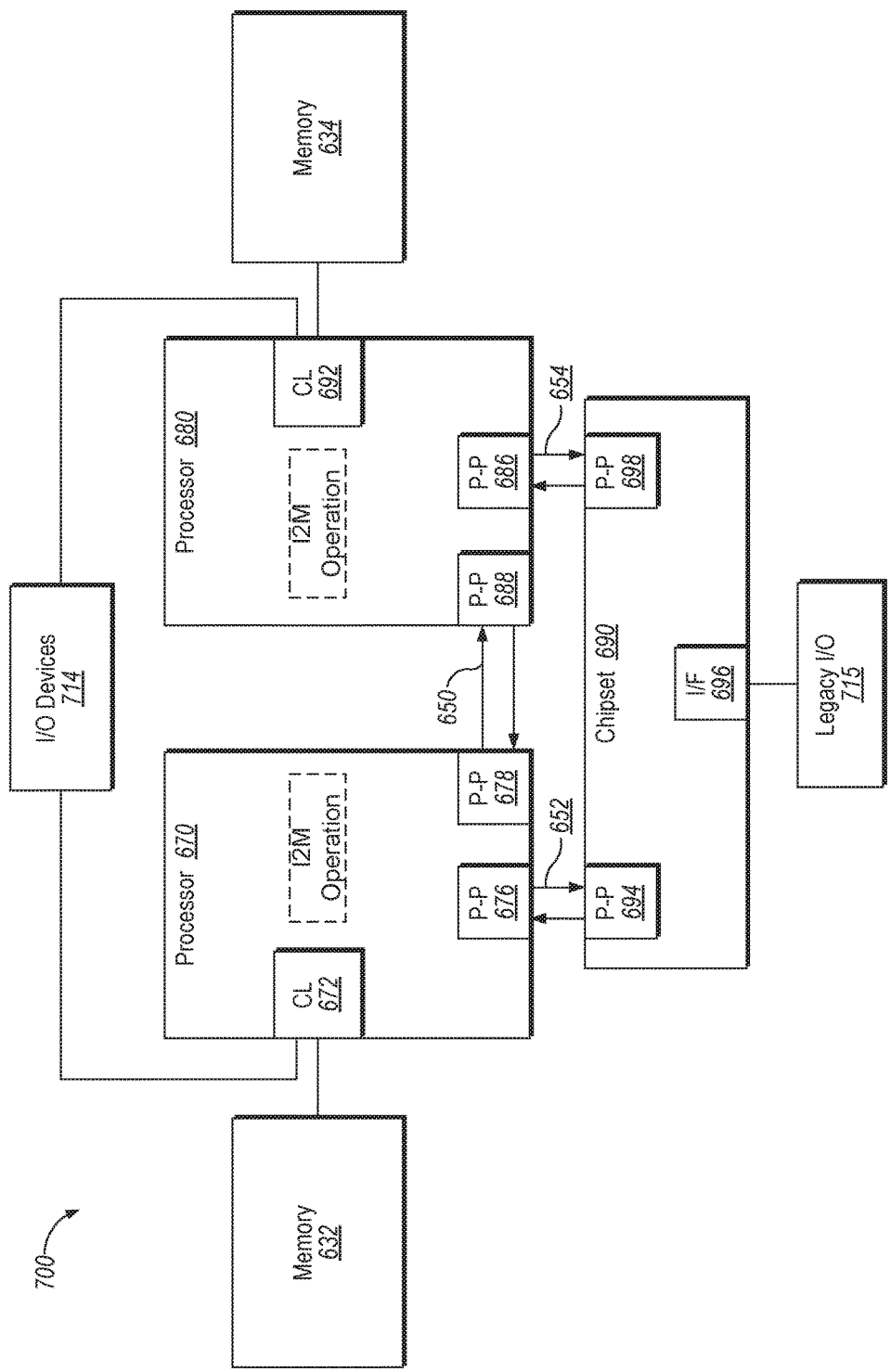
FIG. 7 is a block diagram of a computer system according to another implementation.

Referring now to FIG. 7, shown is a block diagram of a third system 700 in accordance with an embodiment of the present disclosure. Like elements in FIGS. 6 and 7 bear like reference numerals and certain aspects of FIG. 6 have been omitted from FIG. 7 in order to avoid obscuring other aspects of FIG. 7.

FIG. 7 illustrates that the processors 670, 680 may include integrated memory and I/O control logic ("CL") 672 and 682, respectively. For at least one embodiment, the CL 672, 682 may include integrated memory controller units such as described herein. In addition. CL 672, 682 may also include I/O control logic. FIG. 7 illustrates that the memories 632, 634 are coupled to the CL 672, 682, and that I/O devices 714 are also coupled to the control logic 672, 682. Legacy I/O devices 715 are coupled to the chipset 690. The embodiments of the system 100 can be implemented in processor 670, processor 680, or both.

Figure 8:
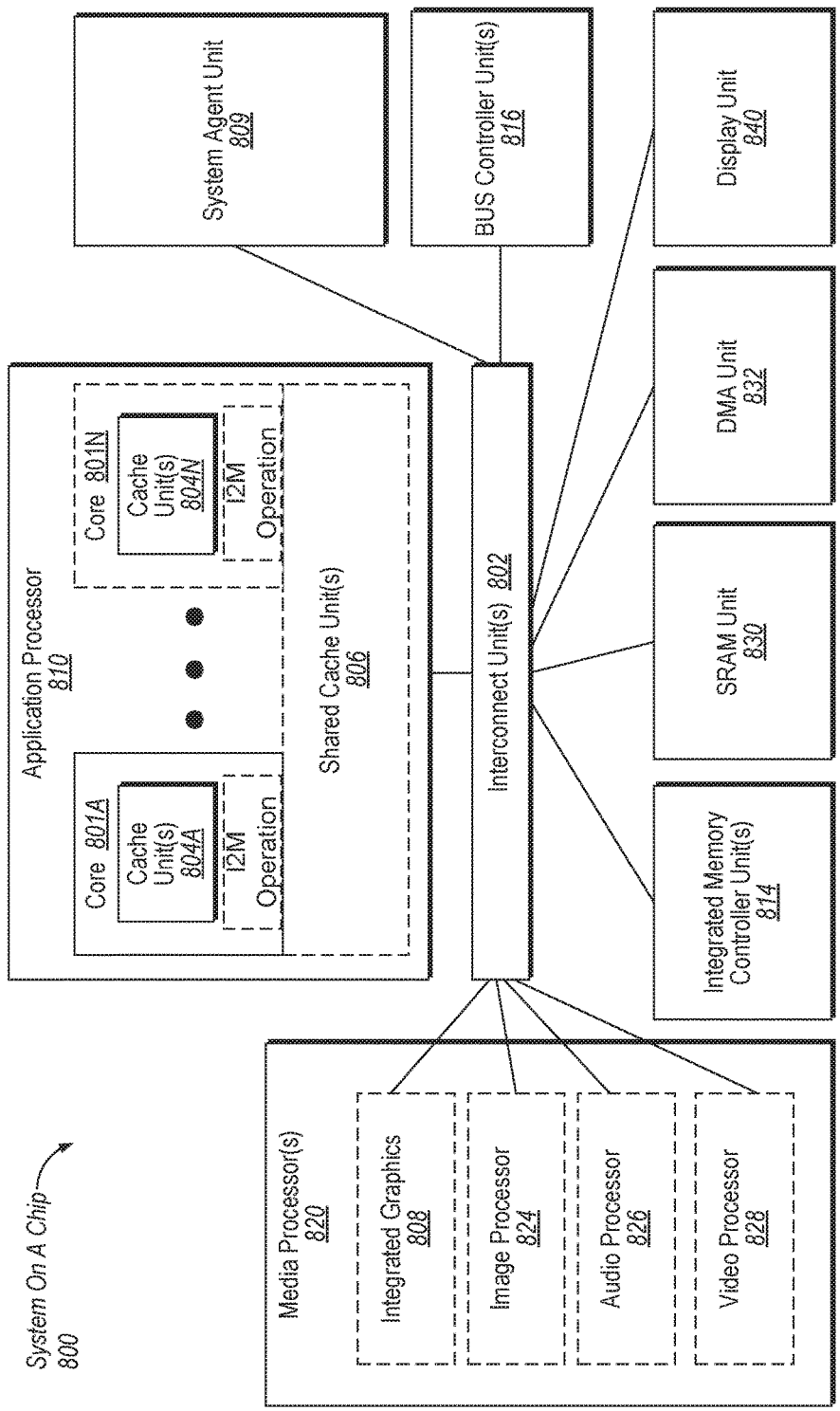
FIG. 8 is a block diagram of a system-on-a-chip according to one implementation.

FIG. 8 is an exemplary system on a chip (SoC) that may include one or more of the cores 801. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, handheld devices, and various other electronic devices, are also suitable. In general, a huge variety of systems or electronic devices capable of incorporating a processor and/or other execution logic as disclosed herein are generally suitable.

Referring now to FIG. 8, shown is a block diagram of a SoC 800 in accordance with an embodiment of the present disclosure. Also, dashed lined boxes are features on more advanced SoCs. In FIG. 8, an interconnect unit(s) 802 is coupled to: an application processor 810 which includes a set of one or more cores 801A-N and shared cache unit(s) 806; a system agent unit 809; a bus controller unit(s) 816; an integrated memory controller unit(s) 814; a set or one or more media processors 820 which may include integrated graphics logic 808, an image processor 824 for providing still and/or video camera functionality, an audio processor 826 for providing hardware audio acceleration, and a video processor 828 for providing video encode/decode acceleration; a static random access memory (SRAM) unit 830; a direct memory access (DMA) unit 832; and a display unit 840 for coupling to one or more external displays. The embodiments of the pages additions and content copying can be implemented in SoC 800.

Figure 9:
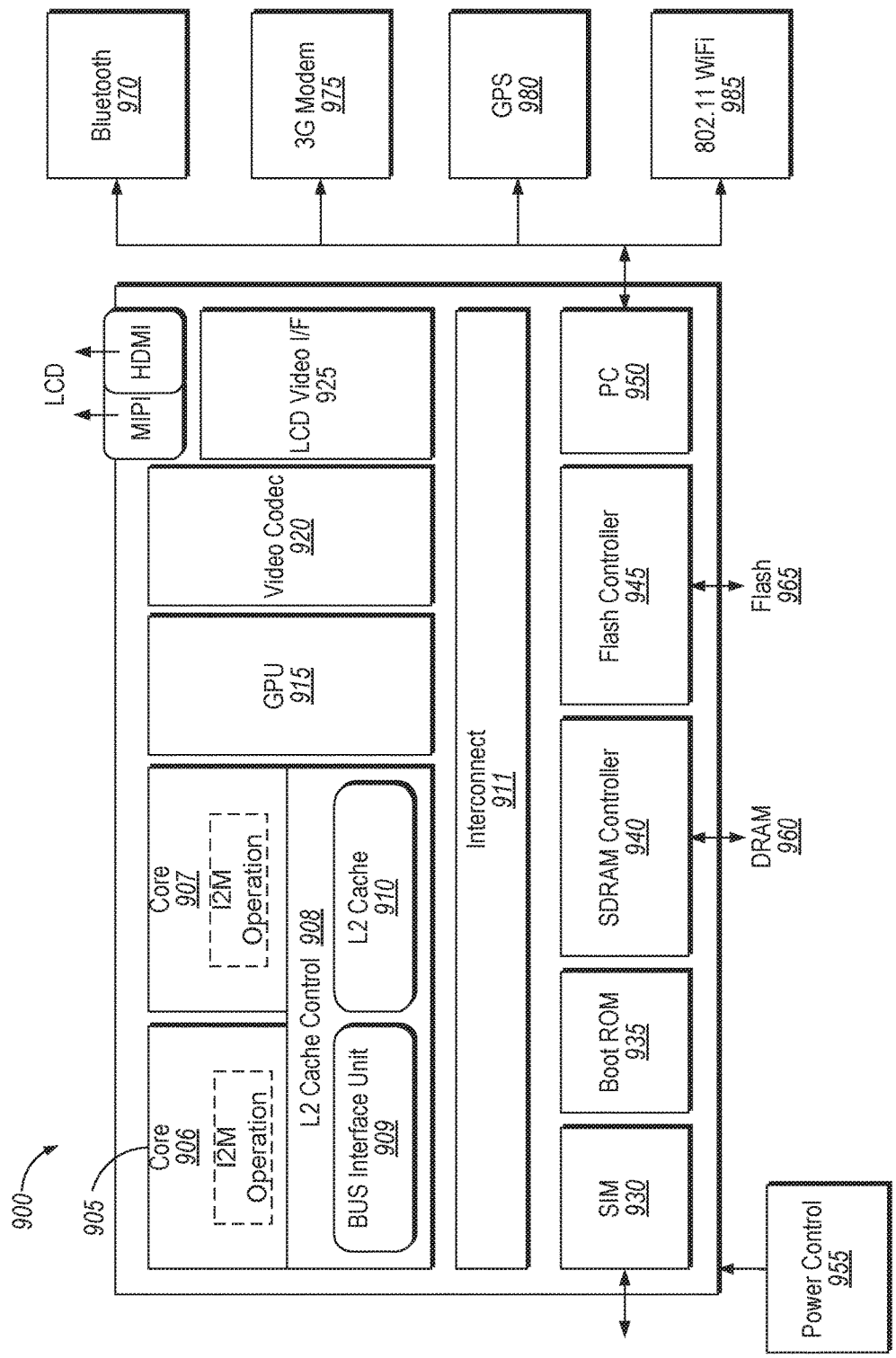
FIG. 9 illustrates another implementation of a block diagram of a computing system.

Turning next to FIG. 9, an embodiment of a system-on-a-chip (SoC) design in accordance with embodiments of the disclosure is depicted. As an illustrative example, SoC 900 is included in user equipment (UE). In one embodiment, UE refers to any device to be used by an end-user to communicate, such as a hand-held phone, smartphone, tablet, ultra-thin notebook, notebook with broadband adapter, or any other similar communication device. A UE may connect to a base station or node, which can correspond in nature to a mobile station (MS) in a GSM network. The embodiments of the system 100 can be implemented in SoC 900.

Here, SoC 900 includes 2 cores—906 and 907. Similar to the discussion above, cores 906 and 907 may conform to an Instruction Set Architecture, such as a processor having the Intel® Architecture Core™, an Advanced Micro Devices, Inc. (AMD) processor, an MIPS-based processor, an ARM-based processor design, or a customer thereof, as well as their licensees or adopters. Cores 906 and 907 are coupled to cache control 908 that is associated with bus interface unit 909 and L2 cache 910 to communicate with other parts of system 900. Interconnect 911 includes an on-chip interconnect, such as an IOSF, AMBA, or other interconnects discussed above, which can implement one or more aspects of the described disclosure.

Interconnect 911 provides communication channels to the other components, such as a Subscriber Identity Module (SIM) 930 to interface with a SIM card, a boot ROM 935 to hold boot code for execution by cores 906 and 907 to initialize and boot SoC 900, a SDRAM controller 940 to interface with external memory (e.g. DRAM 960), a flash controller 945 to interface with non-volatile memory (e.g. Flash 965), a peripheral control 950 (e.g. Serial Peripheral Interface) to interface with peripherals, video codecs 920 and Video interface 925 to display and receive input (e.g. touch-enabled input), GPU 915 to perform graphics related computations, etc. Any of these interfaces may incorporate aspects of the embodiments described herein.

In addition, the system illustrates peripherals for communication, such as a Bluetooth module 970, 3G modem 975, GPS 980, and Wi-Fi 985. Note as stated above, a UE includes a radio for communication. As a result, these peripheral communication modules may not all be included. However, in a UE some form of a radio for external communication should be included.

Figure 10:
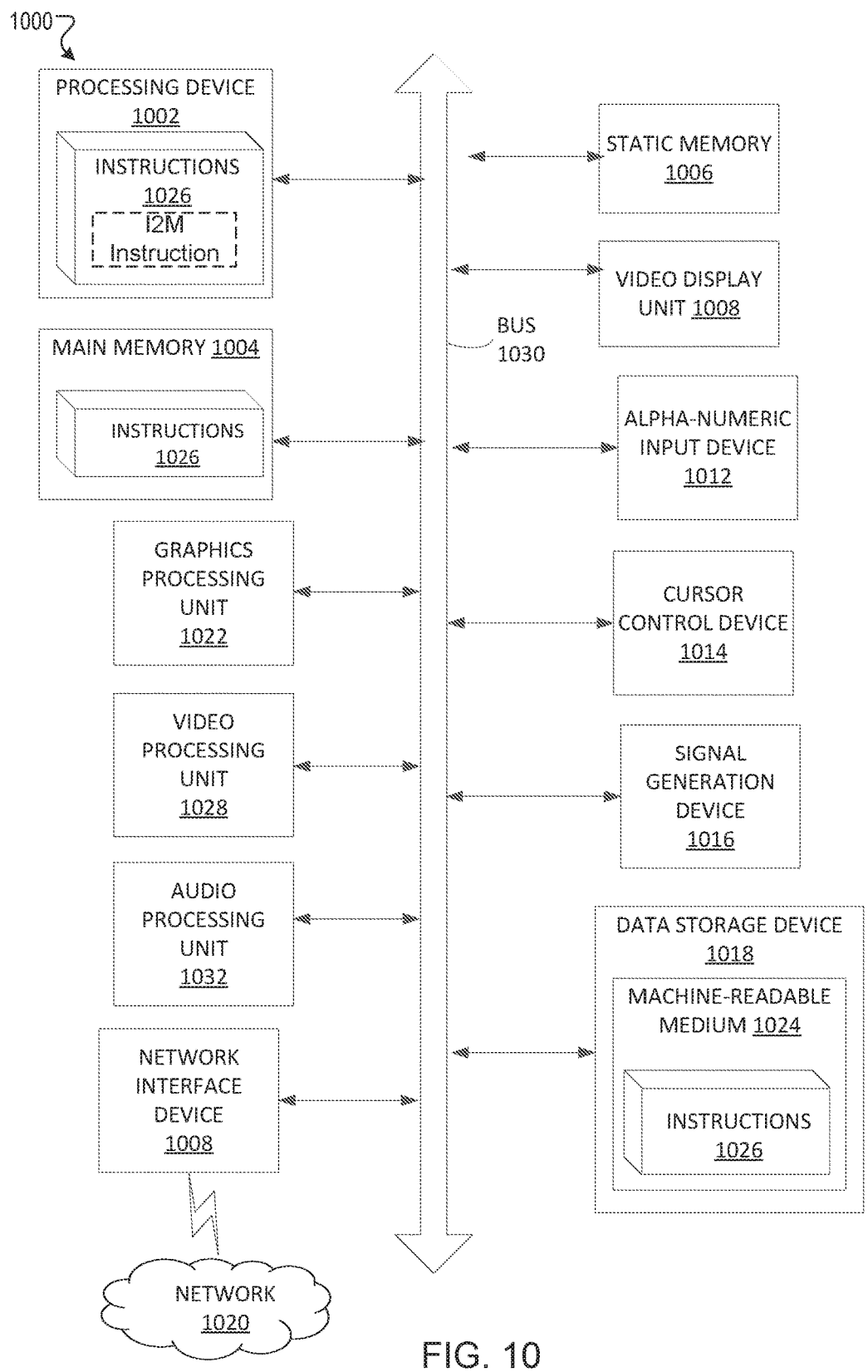
FIG. 10 illustrates another implementation of a block diagram of a computing system.

FIG. 10 illustrates a diagrammatic representation of a machine in the example form of a computing system 1000 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. The embodiments of the system 100 can be implemented in computing system 1000.

The computing system 1000 includes a processing device 1002, main memory 1004 (e.g., read-only memory (ROM), flash memory, dynamic random access memory (DRAM) (such as synchronous DRAM (SDRAM) or DRAM (RDRAM), etc.), a static memory 1006 (e.g., flash memory, static random access memory (SRAM), etc.), and a data storage device 1018, which communicate with each other via a bus 1030.

Processing device 1002 represents one or more general-purpose processing devices such as a microprocessor, central processing unit, or the like. More particularly, the processing device may be a complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 1002 may also be one or more special-purpose processing devices such as an application specific integrated circuit (ASIC), a field-programmable gate array (FPGA), a digital signal processor (DSP), network processor, or the like. In one embodiment, processing device 1002 may include one or processor cores. The processing device 1002 is configured to execute the instructions 1026 (e.g., processing logic) for performing the operations discussed herein. In one embodiment, processing device 1002 can include the processor 112 or 138 of FIG. 1. Alternatively, the computing system 1000 can include other components as described herein. It should be understood that the core may not support multithreading (e.g., executing two or more parallel sets of operations or threads, time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology)).

The computing system 1000 may further include a network interface device 1008 communicably coupled to a network 1020. The computing system 1000 also may include a video display unit 1010 (e.g., a liquid crystal display (LCD) or a cathode ray tube (CRT)), an alphanumeric input device 1012 (e.g., a keyboard), a cursor control device 1014 (e.g., a mouse), a signal generation device 1016 (e.g., a speaker), or other peripheral devices. Furthermore, computing system 1000 may include a graphics processing unit 1022, a video processing unit 1028 and an audio processing unit 1032. In another embodiment, the computing system 1000 may include a chipset (not illustrated), which refers to a group of integrated circuits, or chips, that are designed to work with the processing device 1002 and controls communications between the processing device 1002 and external devices. For example, the chipset may be a set of chips on a motherboard that links the processing device 1002 to very high-speed devices, such as main memory 1004 and graphic controllers, as well as linking the processing device 1002 to lower-speed peripheral buses of peripherals, such as USB, PCI or ISA buses.

The data storage device 1018 may include a computer-readable storage medium 1024 on which is stored instructions 1026 (e.g., software) embodying any one or more of the methodologies of functions described herein. The instructions 1026 (e.g., software) may also reside, completely or at least partially, within the main memory 1004 as instructions 1026 and/or within the processing device 1002 as processing logic during execution thereof by the computing system 1000; the main memory 1004 and the processing device 1002 also constituting computer-readable storage media.

The computer-readable storage medium 1024 may also be used to store instructions 1026 utilizing the processing device 1002, such as the processor 112 or 138 described with respect to FIG. 1, and/or a software library containing methods that call the above applications. While the computer-readable storage medium 1024 is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instruction for execution by the machine and that cause the machine to perform any one or more of the methodologies of the present embodiments. The term "computer-readable storage medium" shall accordingly be taken to include, but not be limited to, solid-state memories, and optical and magnetic media.

The following examples pertain to further embodiments.

Example 1 is a multi-core system comprising: 1) a first cache comprising a first memory line to store data, wherein the first memory line is set to an invalid state; 2) a first processor core coupled to the first cache, the first processor core to: a) receive a first request from an application to write a first data set to the first cache; b) determine that a data size of the first data set is within a data size range; c) receive a second request from the application to write a second data set to the first cache; d) determine that an aggregate data size of the first data set and the second data set is at least a data size of the first memory line; e) performing an invalid-to-modify (I2M) operation to change the first memory line from the invalid state to a modified state; and f) write the first data set and the second data set to the first memory line.

In Example 2, the multi-core system of Example 1, further comprising a second processor core and a second cache coupled to the second processor, wherein the first processor core is further to: 1) send the data in the memory line to the second processor core to store in a memory line of the second cache; or 2) send the data in the memory line to a memory interface coupled to a main memory, the memory interface to store in a memory line of the main memory.

In Example 3, the multi-core system of any one of Examples 1-2, further comprising: a second processor core and a second cache coupled to the second processor, wherein: a) the first cache is independent of the second cache; and b) the main memory is shared between the first processor core and the second processor core.

In Example 4, the multi-core system of any one of Examples 1-3, wherein the first processor core comprises a counter, the first processor core is further to set a counter for a predefined amount of time, wherein the first processor core receives the second request within the predefined amount of time.

In Example 5, the multi-core system of any one of Examples 1-4, wherein the memory line is 64 bytes in size and the data size range can be set to range from 16 bytes to 63 bytes.

In Example 6, the multi-core system of any one of Examples 1-5, wherein the modified state enables the first processor core to modify the memory line without fetching the third data from the main memory.

In Example 7, the multi-core system of any one of Examples 1-6, the first processor core further comprising a data buffer to store the first data set and the second data set until the processor core writes the first data set and the second data set to the memory line.

Various embodiments can have different combinations of the structural features described above. For instance, all optional features of the computing system described above can also be implemented with respect to the method or process described herein and specifics in the examples can be used anywhere in one or more embodiments.

Example 8 is a system on a chip (SoC) comprising: 1) a first memory to store data in a memory line, wherein the memory line is set to an invalid state; and 2) a processor coupled to the first memory, wherein the processing is operable to: a) determine that a data size of a first data set received from an application is within a data size range; b) determine that an aggregate data size of the first data set and a second data set received from the application is at least a same data size as data size of the memory line; c) perform an invalid-to-modify (I2M) operation to change the memory line from the invalid state to a modified state; and d) write the first data set and the second data set to the memory line.

In Example 9, the processor of Example 8, wherein the processing is further operable to set a counter for a predefined amount of time.

In Example 10, the processor of any one of Examples 8-9, wherein the processing is further operable to: a) receive a first request from the application to write the first data set to the memory line in the memory; and b) receive a second request from the application within the predefined amount of time to write the second data set to the memory line In Example 11, the processor of any one of Examples 8-10, wherein the first request comprises: 1) a memory address of the memory line in the first memory; and 2) data to be written to the memory line.

In Example 12, the processor of any one of Examples 8-11, wherein the processing is further operable to send the data in the memory line to another memory line in a second memory or a main memory of a memory system.

In Example 13, the processor of any one of Examples 8-12, wherein the first memory and the second memory comprise static random access memory (SRAM) cells and the main memory comprises dynamic random access memory (DRAM) cells.

In Example 14, the processor of any one of Examples 8-13, wherein the memory is unique to the processor and the main memory is shared between a plurality of processors.

In Example 15, the processor of any one of Examples 8-14, wherein the memory line is 64 bytes in size and the data size range can be set to range from 16 bytes to 63 bytes.

Various embodiments can have different combinations of the structural features described above. For instance, all optional features of the computing system described above can also be implemented with respect to the method or process described herein and specifics in the examples can be used anywhere in one or more embodiments.

Example 16 is a method comprising: 1) receiving a first request from an application to write a first data set to a first cache, wherein the memory line is set to an invalid state; 2) determining, by a processor, that a data size of the first data set is with a data size range; 3) setting, by the processor, a counter for a predefined amount of time; 4) determining, by the processor, that the predefined amount of time has expired; and 5) in response to the predefined amount of time expiring, performing, by the processor, a request for ownership (RFO) operation, the RFO operation comprising: a) a read operation to retrieve a second data set from a main memory, a location of the second data set in the main memory corresponding to a location of the first data set in the first cache; b) a write operation to write the data in the first data set to the memory line; and c) an invalidate operation to write the data in the memory line to a second cache or the main memory.

In Example 17, the method of Example 16, wherein the processor is further to set a counter for a predefined amount of time, wherein the processor does not receive a second request to write a second data set to the memory line within the predefined amount of time.

In Example 18, the processor of any one of Examples 16-17, wherein the memory line is 64 bytes in size and the data size range ranges from 16 bytes to 63 bytes.

In Example 19, the processor of any one of Examples 16-18, wherein the cache is unique to the processor and the main memory is shared between a plurality of processors.

In Example 20, the processor of any one of Examples 16-19, wherein the first cache and the second cache comprise static random access memory (SRAM) cells and the main memory comprises dynamic random access memory (DRAM) cells.

Various embodiments may have different combinations of the structural features described above. For instance, all optional features of the computing system described above may also be implemented with respect to the method or process described herein and specifics in the examples may be used anywhere in one or more embodiments.

While the present disclosure has been described with respect to a limited number of embodiments, those skilled in the art will appreciate numerous modifications and variations therefrom. It is intended that the appended claims cover all such modifications and variations as fall within the true spirit and scope of this present disclosure.

In the description herein, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the present disclosure. It will be apparent, however, to one skilled in the art that these specific details need not be employed to practice the present disclosure. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system have not been described in detail in order to avoid unnecessarily obscuring the present disclosure.

The embodiments are described with reference to access control in specific integrated circuits, such as in computing platforms or microprocessors. The embodiments may also be applicable to other types of integrated circuits and programmable logic devices. For example, the disclosed embodiments are not limited to desktop computer systems or portable computers, such as the Intel® Ultrabooks™ computers. And may be also used in other devices, such as handheld devices, tablets, other thin notebooks, systems on a chip (SoC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below. It is described that the system can be any kind of computer or embedded system. The disclosed embodiments may especially be used for low-end devices, like wearable devices (e.g., watches), electronic implants, sensory and control infrastructure devices, controllers, supervisory control, and data acquisition (SCADA) systems, or the like. Moreover, the apparatuses, methods, and systems described herein are not limited to physical computing devices, but may also relate to software optimizations for energy conservation and efficiency. As will become readily apparent in the description below, the embodiments of methods, apparatuses, and systems described herein (whether in reference to hardware, firmware, software, or a combination thereof) are vital to a 'green technology' future balanced with performance considerations.

Although the embodiments herein are described with reference to a processor, other embodiments are applicable to other types of integrated circuits and logic devices. Similar techniques and teachings of embodiments of the present disclosure can be applied to other types of circuits or semiconductor devices that can benefit from higher pipeline throughput and improved performance. The teachings of embodiments of the present disclosure are applicable to any processor or machine that performs data manipulations. However, the present disclosure is not limited to processors or machines that perform 512 bit, 256 bit, 128 bit, 64 bit, 32 bit, or 16 bit data operations and can be applied to any processor and machine in which manipulation or management of data is performed. In addition, the description herein provides examples, and the accompanying drawings show various examples for the purposes of illustration. However, these examples should not be construed in a limiting sense as they are merely intended to provide examples of embodiments of the present disclosure rather than to provide an exhaustive list of all possible implementations of embodiments of the present disclosure.

Although the below examples describe instruction handling and distribution in the context of execution units and logic circuits, other embodiments of the present disclosure can be accomplished by way of a data or instructions stored on a machine-readable, tangible medium, which when performed by a machine cause the machine to perform functions consistent with at least one embodiment of the disclosure. In one embodiment, functions associated with embodiments of the present disclosure are embodied in machine-executable instructions. The instructions can be used to cause a general-purpose or special-purpose processor that is programmed with the instructions to perform the steps of the present disclosure. Embodiments of the present disclosure may be provided as a computer program product or software which may include a machine or computer-readable medium having stored thereon instructions which may be used to program a computer (or other electronic devices) to perform one or more operations according to embodiments of the present disclosure. Alternatively, operations of embodiments of the present disclosure might be performed by specific hardware components that contain fixed-function logic for performing the operations, or by any combination of programmed computer components and fixed-function hardware components.

Instructions used to program logic to perform embodiments of the disclosure can be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine-readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present disclosure.

A module as used herein refers to any combination of hardware, software, and/or firmware. As an example, a module includes hardware, such as a micro-controller, associated with a non-transitory medium to store code adapted to be executed by the micro-controller. Therefore, a reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, wherein the latent state the apparatus, hardware, and/or element is designed to perform a particular task when the apparatus, hardware, and/or element is operating.

Furthermore, use of the phrases 'to,' 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example, the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information therefrom.

Instructions used to program logic to perform embodiments of the disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer)

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplary language does not necessarily refer to the same embodiment or the same example, but may refer to different and distinct embodiments, as well as potentially the same embodiment.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like. The blocks described herein can be hardware, software, firmware or a combination thereof.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "defining," "receiving," "determining," "issuing," "linking," "associating," "obtaining," "authenticating," "prohibiting," "executing," "requesting," "communicating," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Also, the terms "first," "second," "third," "fourth," etc. as used herein are meant as labels to distinguish among different elements and may not necessarily have an ordinal meaning according to their numerical designation.

What is claimed is:

1. A multi-core processor comprising:
   a first cache comprising a first memory line to store data, wherein the first memory line is set to an invalid state; and
   a first processor core coupled to the first cache, the first processor core to:
      receive a first request from an application to write a first data set to the first cache;
      determine that a data size of the first data set is within a data size range;
      in response to the data size of the first data set being below the data size range, execute a request for ownership (RFO) operation; and
      in response to the data size of the first data set being within the data size range:
         receive a second request from the application to write a second data set to the first cache;
         determine that an aggregate data size of the first data set and the second data set is at least a data size of the first memory line;
         subsequent to reception of the first request, reception of the second request, and determination of the aggregate data size, perform an invalid-to-modify (I2M) operation to change the first memory line from the invalid state to a modified state; and
         write an aggregate of the first data set and the second data set to the first memory line.

2. The multi-core processor of claim 1, further comprising:
   a second processor core and a second cache coupled to the second processor, wherein the first processor core is further to one of:
      send the data in the memory line to the second processor core to store in a memory line of the second cache; or
      send the data in the memory line to a memory interface coupled to a main memory, the memory interface to store the data in a memory line of the main memory.

3. The multi-core processor of claim 2, further comprising:
   a second processor core and a second cache coupled to the second processor core, wherein:
      the first cache is independent of the second cache; and
      the main memory is shared between the first processor core and the second processor core.

4. The multi-core processor of claim 1, wherein the first processor core comprises a counter, and wherein the first processor core is further to:
   set a counter for a predefined amount of time; and
   receive the second request within the predefined amount of time.

5. The multi-core processor of claim 1, wherein the memory line is 64 bytes in size and the data size range is set to a range from between 16 bytes and 63 bytes.

6. The multi-core processor of claim 1, wherein the modified state enables the first processor core to modify the memory line without fetching a third data from a main memory.

7. The multi-core processor of claim 1, the first processor core further comprising a data buffer to store the first data set and the second data set until the processor core writes the first data set and the second data set to the memory line.

8. A system on a chip (SoC), comprising:
   a first memory to store data in a memory line, wherein the memory line is set to an invalid state; and
   a processor coupled to the first memory, wherein the processor is to:
      determine that a data size of a first data set received from an application is within a data size range;

in response to the data size of the first data set being below the data size range, execute a request for ownership (RFO) operation; and in response to the data size of the first data set being within the data size range:
- determine that an aggregate data size of the first data set and a second data set received from the application is at least a same data size as data size of the memory line;
- perform an invalid-to-modify (I2M) operation to change the memory line from the invalid state to a modified state after a determination that the aggregate data size of the first data set and the second data set received from the application is at least the same data size of the memory line; and
- write an aggregate of the first data set and the second data set to the memory line.

9. The SoC of claim 8, wherein the processor is further to set a counter for a predefined amount of time.

10. The SoC of claim 9, wherein the processing is further to:
- receive a first request from the application to write the first data set to the memory line in the memory; and
- receive a second request from the application within the predefined amount of time to write the second data set to the memory line.

11. The SoC of claim 10, wherein the first request comprises:
- a memory address of the memory line in the first memory; and
- data to be written to the memory line.

12. The SoC of claim 8, wherein the processor is further to send the data in the memory line to another memory line in a second memory or a main memory of a memory system.

13. The SoC of claim 12, wherein the first memory and the second memory comprise static random access memory (SRAM) cells and the main memory comprises dynamic random access memory (DRAM) cells.

14. The SoC of claim 12, wherein the first memory is unique to the processor and the main memory is shared between a plurality of second processors.

15. The SoC of claim 8, wherein the memory line is 64 bytes in size and the data size range is set to a range from between 16 bytes and 63 bytes.

* * * * *